United States Patent

[11] 3,593,702

| [72] | Inventor | Emanuele Zigomalas |
| | | 20, Via Leonardo da Vinci, 20094 Corsico, Italy |
| [21] | Appl. No. | 883,779 |
| [22] | Filed | Dec. 10, 1969 |
| [45] | Patented | July 20, 1971 |
| [32] | Priority | Dec. 19, 1968 |
| [33] | | Italy |
| [31] | | 25,348 A/68 |

[54] NONSTICK RESIN-COATED COOKING UTENSILS
10 Claims, 10 Drawing Figs.

[52] U.S. Cl........................................ 126/390, 220/64
[51] Int. Cl........................................ A47j 27/00
[50] Field of Search........................... 126/390; 220/64

[56] References Cited
UNITED STATES PATENTS
1,970,151  8/1934  Smith........................ 126/390
3,008,601  11/1961  Cahne....................... 126/390 X

*Primary Examiner*—Carroll B. Dority, Jr.
*Attorney*—Michael S. Striker

ABSTRACT: The disclosure describes a cooking utensil, such as a frying pan, comprising a vessel-forming aluminum body having one or more preferably annular protusions downwardly projecting from its planar bottom for abutment on the parts and surfaces whereon the utensil are superimposed and supported for use, said body having its inner and outer surfaces coated with polytetrafluoroethylene (or equivalent nonstick resin) in their entirety except at the tips of said protusions where said abutment actually occurs.

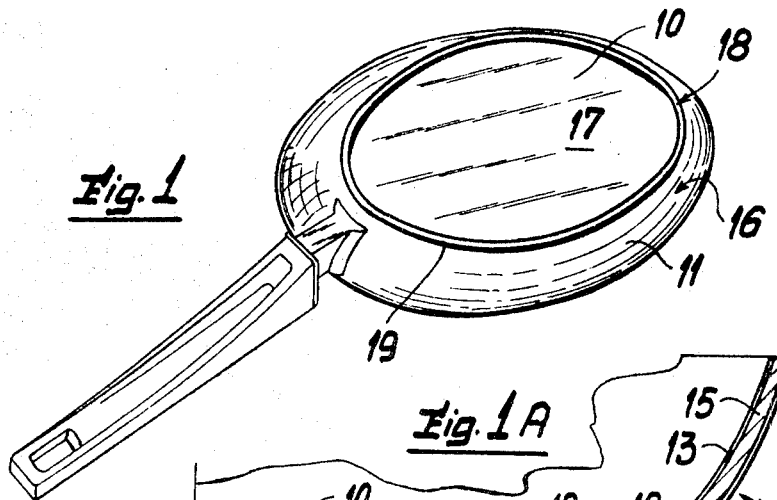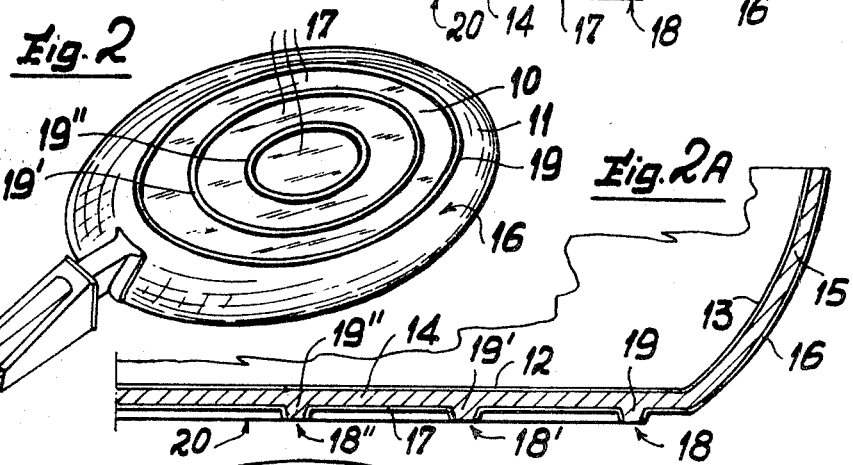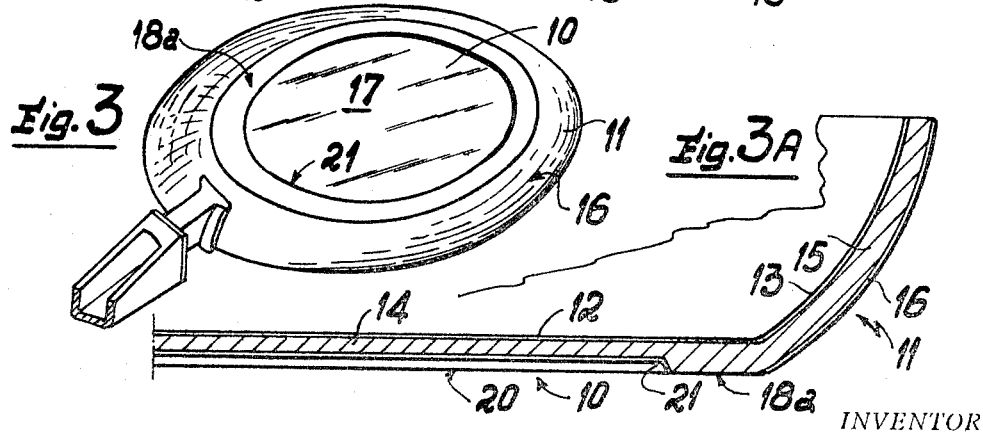

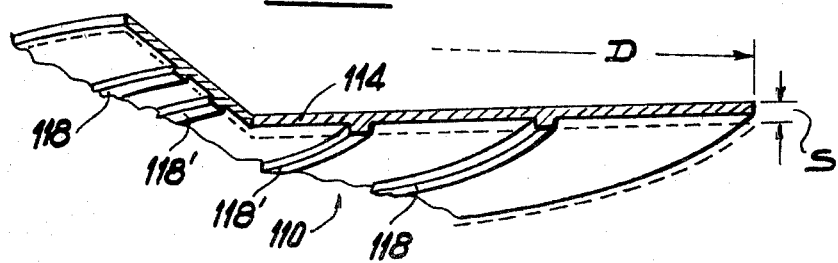
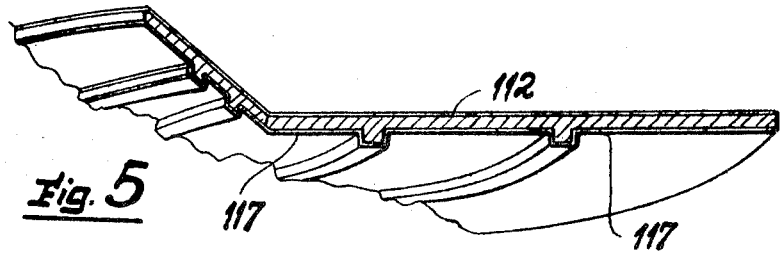
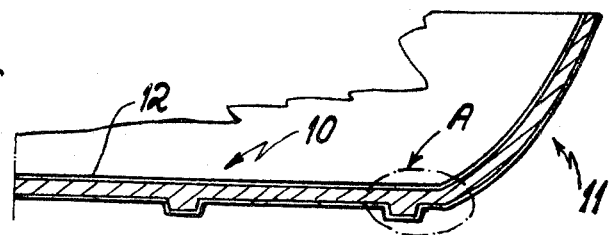
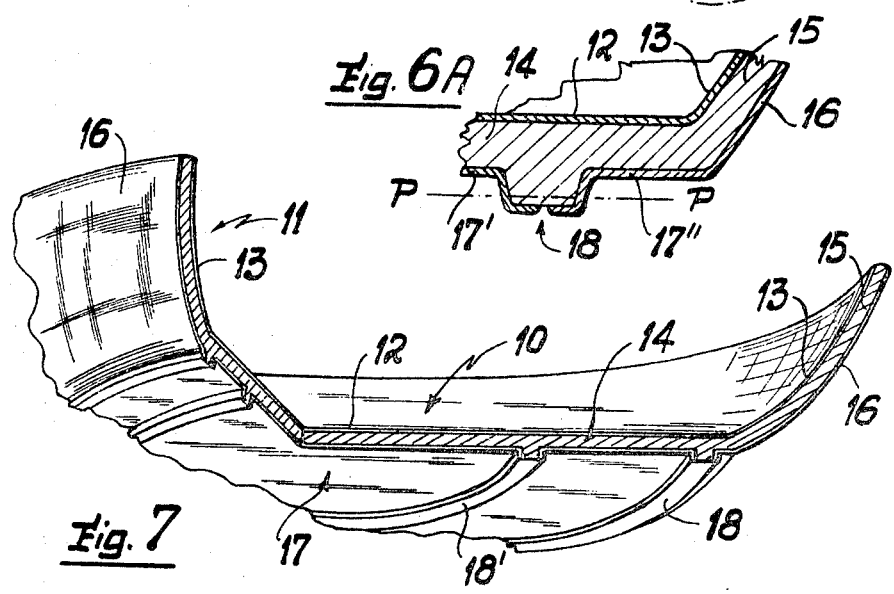

3,593,702

NONSTICK RESIN-COATED COOKING UTENSILS

BACKGROUND OF THE INVENTION

This invention relates to household appliances and more particularly to cooking utensils, such as stew, frying or other pans, or similar articles a metal more particularly an aluminum body and nonstick surfaces formed by a coating of nonstick resin, such as certain silicones and more particularly fluorocarbons.

Such nonstick-coated cooking utensils are well known and widely manufactured. Such utensils are generally resin coated with a suitable nonstick resin, such as polytetrafluoroethylene, on the inner surface of their aluminum base or body, that is on their upwardly and inwardly facing surfaces designed to be contacted with the food, while their outer surfaces are left uncoated.

The advantages of such inside coated utensils and cooking vessels are also well known and do not require extensive comments. Their nonstick surface provides easier cooking of foods, leads to substantial saving of fatty substances, such as oil, butter, lard and so on, conventionally used for preventing the food from sticking and carbonize, and is easily cleaned without requiring time-consuming and fatiguingly manual rubbing off of residues of food after cooking.

The easy cleaning of said nonstick surfaces is an important factor for appreciation of such relatively is an important factor for appreciation of such relatively new household implements. It has been experienced and confirmed that the cleaning of for example the polytetrafluoroethylene-coated surfaces of said cooking utensils can be as well ensured by the operation of conventional household dishwashers and such property is evidently desirable and appreciated.

On the other part, such dishwashers, which act by means of sprays of hot water wherein suitable detergents are added, can properly clean only surfaces on which the residues cannot or weakly stick. There have been proposed an manufactured therefore cooking pans and other vessels the entire aluminum base or body is coated with such nonstick silicones or fluorocarbons, that is which have both their inner and outer surfaces coated with said resins. Such utensils can actually be cleaned in any by dishwashers and anyway their proper cleaning is very facilitated.

All of these known coatings are however easily damaged by contact with hard and sharp parts and bodies, such as the surfaces of marble-clad kitchen tables, radiant plates of electric stoves, the grates of gas hotplates and so on, where the cooking vessels must necessarily be supported. The outer surfaces and more particularly the downward-facing planar face of the bottom portion of the vessel is thus fastly damaged by actual even careful use of the article, the useful line of which is therefore undesirably short.

It is therefore the principal object of this invention to provide new and improved cooking utensils both the inner and outer surfaces of which are substantially wholly coated with a nonstick resinous layer of the type considered above, and wherein the outer bottom surface of the vessel is positively protected against actual contact with hard and essentially planar support surfaces, grates and the like, whereon the utensil is supported for its use and conservation.

SUMMARY OF THE INVENTION

Accordingly, the invention resides broadly in a cooking utensil comprising a metallic body having a planar bottom portion and a sidewall portion, wherein such bottom portion has downwardly projecting parts, preferably one or more annular parts extending over a very minor fraction of the surface area of said planar bottom, and wherein all inner and outer surfaces of said body are coated to provide nonstick surfaces except at the downwardly facing top faces of said projecting parts on which the article actually contacts the bodies on which it can be and actually is supported.

The invention will be more readily understood from the following detailed description of but few examples of the new utensils and of the principal steps for providing same, said examples being shown in the accompanying drawings.

BRIEF DESCRIPTION OF THE VIEWS OF THE DRAWINGS

FIGS. 1, 2 and 3 are diagrammatical perspective views of the underside of three embodiments of the invention;

FIGS. 1A, 2a and 3a are fragmentary sectional views of said embodiments, taken in diametral planes thereof;

FIGS. 4 and 5 are perspective, fragmentary and sectional views of a blank prepared and coated for the manufacture of a further embodiment of the invention;

FIG. 6 is a view similar to those of FIGS. 1A—3A of the coated blank of FIG. 5 after forming it into a hollow body or vessel;

FIG. 6A is a detail in greater scale of the portion defined within contour -A- in FIG. 6; and FIG. 7 is a perspective fragmentary sectional view of the said further embodiment of the invention.

DETAILED DESCRIPTION OF THE PREFERRED EMBODIMENTS

Referring now to the drawings, wherein like reference numerals refer to like equivalent parts throughout the several figures:

The body of the utensil, such as a frying pan comprises a planar bottom, generally indicated at 10, and upturned sidewalls, generally indicated at 11, and it is conventionally coated to provide the desired nonstick surface in its inner face, by an uninterrupted layer 12, 13 say of fused polytetrafluoroethylene, which covers the bottom and side parts 14 and respectively 15 of the metal say aluminum body of the implement, which is further provided with one or more handle means and dimensioned and shaped according to its use, as conventional in the art. Further according to current art, the utensil is polytetrafluoroethylene (or other nonstick and preferably fluorocarbon polymer) coated by applying a layer of the emulsified polymer to the faces of a disclike blank, fusing or otherwise processing the thus coated blank and then forming the vessel from the coated blank, such as by stamping, by turning it in a spinning lathe and so on. The various step for preparing the aluminum blank for its coating and for setting the applied layer are also known in the art and do not relate to the invention.

As shown in FIGS. 1 to 3A and 7, the improved utensil has its outer surfaces coated also in nearly the entirety thereof, that is the outside of the wall portion 15 has an uninterrupted coating 16 applied thereto, and the lower face of the planar bottom portion 14 has also a coating 17 applied to the very greatest portion of its surface area.

According to the gist of the invention, this bottom portion has however one or more downwardly directed protusions, which protude have its or their face or faces 18 uncovered. Such protusions are generally annular and of small width, such as few millimeters.

The improved utensil can be provided with a different number of differently arranged protusions. For example:

the embodiment of FIGS. 1 and 1A has one annular protusions 19 downwardly projecting from the planar bottom of the vessel and providing an uncovered thin annular area 18 slightly inwardly spaced from the very contour of the planar bottom;

the embodiment of FIGS. 2 and 2A has an outer protusion 19 such as the one of FIGS. 1 and 1A, and two other smaller concentric portusions 19' and 19" so that three concentric and evenly spaced narrow annular uncoated areas 18, 18' and 18" are provided;

the embodiment of FIGS. 3 and 3A is particularly adapted for small pans and cooking vessels, such as for heating milk and so on, of small diametral dimensions. It has an uncoated annular surface 18a forming the contour of the planar bottom having its outer border where the side and bottom portions 15 and 14 are adjacent, and confining therein the entire coated portion 17 of the planar bottom of the vessel;

the embodiment of FIG. 7 is for medium-sized cooking utensils and it is intermediate between those of FIGS. 1 and 1A and of FIGS. 2 and 2A, as having two annular concentric uncoated narrow faces 18 and 18'.

The number and the radial spacing of said protusions depend from the dimensions of the cooking vessel, taking in mind that the object of such protusion or protusions in that of protecting the coated planar portion or portions 17 of the bottom to contact and to be contacted by hard bodies during handling and servicing of the utensil. Therefore, the utensil is provided with at least one annular protusion of diameter less than that of the smallest hotplate with which the conventional electric or flame household heating means are provided with. Thus, the embodiment of FIGS. 3 and 3A is adapted for the smallest pans, pots and the like. The embodiments of FIGS. 1 and 1A, of FIG. 7 and of FIGS. 2 and 2A are adapted for small and respectively for medium and for large cooking vessel, as above indicated.

In any case, the said protruding areas jointly define a plane 20 (FIGS. 1A, 2A and 3A) which is parallel to and downwardly spaced from the plane having the repellent or nonstick coating 17 applied thereto. Such coating is therefore fully protected against contact with any planar surface (such as of a table or of a hotplate) or with parts defining a support plane, such as the components of the grate or grid above the burner of a gas stove or range.

It has been found that the provision of protusions such as above improves the heat absorption from the hotplate on which the utensil is supported for use. It has further and surprisingly been found that the provision of narrow annular areas, such the areas generally indicated at 18, does not impairs the easeness of cleaning all parts of the utensil, because on such uncoated narrow areas small spots of tarlike or carbon can stick, or such areas can be soiled or stained only by dirt or substances which might be present on the parts on which the utensil has actually been superimposed. In actual use of the improved utensils, they can be completely cleaned into and by conventional dishwashers, in the most of occurrences, and the spots or stain can be very easily and effortlessly wiped off by a gentle rubbing on with a wet cloth, so that the resinous coating will never be damaged or scraped.

Such advantages are particularly attained when the uncoated areas are more than 4-5 millimeters wide (8 to 10 millimeters in the embodiment of FIGS. 3 and 3A) and the plane 20 of actual support of the utensil is about 2 millimeters spaced from the actually coated planar surface bottom.

An improved utensil such as shown in the drawings, in particular in FIG. 7, can be advantageously but not exclusively produced by the steps shown in FIGS. 4 to 6A. A blank 114 cut from in particular punched off an aluminum sheeting is provided of such diameter D adapted for forming the desired cooking utensil body therefrom, the said blank having the desired number of protusions, such as 118 and 118' secured to or preferably integrally formed with at the locations corresponding to the part 110 of the blank, from which the bottom 10 of the vessel will be formed.

Such protusions such as 118 and 118' can be made by applying metal, such as by welding, on the blank 114, or by hot stamping or pressing. Alternatively, the protusions may be made by turning on a lathe a disc of thickness S equal to the thickness of the coated parts plus the projection of said protusions.

The blank of FIG. 4 is then coated at its both faces (by applying current techniques) to provide uninterrupted layers 112 and 117 of nonstick polymer thereon (FIG. 5), preferably of polytetrafluoroethylene (the polymer sold under the name "Teflon," a registered trade name, for example). Still applying current techniques, the vessel of the cooking utensil, such as fragmentarily shown in FIG. 6, is formed by the coated blank of FIG. 5.

As shown in FIG. 6A, the coating on the outer face of the protusion or of any protusions does not require to be perfect or uninterrupted. By applying the emulsified polymer by brushing a rotating blank (according to the art), the operator carefully acts for forming a proper layer on the areas such as 17' and 17" adjacent to the or to any protusion and on the flanks of such protusion or protusions only.

And thus nearly completed but still unfinished vessel is then mechanically processed, by turning or grinding for example, to plane off the top of the protruding parts, such as down to the plane P-P of FIG. 6A, for taking away the corresponding portion of the coating material and providing the uncoated face 18 which will at its turn provide the actual support plane, such as indicated at 20 in FIGS. 1A, 2A and 3A.

I claim:

1. An improved cooking utensil or vessel consisting of a hollow metallic body having a planar bottom and an upwardly directed sidewall portion and having an uninterrupted nonstick surface formed by a film or layer of repellent resinous material, such as polytetrafluoroethylene, covering the entire inner surface of said body, the said utensil comprising protruding parts downwardly projecting from the lower face of said planar bottom and defining a plane of actual abutment and support of the utensil, parallel to and downwardly spaced from the plane defined by the adjacent areas of said lower face, and a layer of repellent resinous material covering the entire outer surface of said body except at said protruding parts.

2. The improved utensil of claim 1, wherein said protruding parts are of uninterrupted annular configuration parallel to the contour of said planar bottom.

3. The improved utensil of claim 2, comprising a plurality of concentrically arranged annular protruding parts.

4. The improved utensil of claim 2, which comprises one uncoated annular part adjacent to and inwardly extended from the outer border of said planar bottom and circumscribing a recessed planar area coated with said repellent resinous material.

5. The improved utensil of claim 1, which comprises protruding parts including a planar narrow downturned face in said plane of abutment and flank portions, the said layer of repellent resinous material extending to cover said flank portions while the metal of said metallic body is uncovered at said downturned face.

6. The improved utensil of claim 1, which comprises downturned protruding parts integrally formed with said metallic body thereof.

7. The improved utensil of claim 6, wherein the said protruding parts are formed by turning metal off from a blank of thickness equal to the thickness of its body bottom portion including said nonstick surface plus the projection of said protruding parts from the plane defined by the lower face of said bottom portion.

8. The method for producing an improved cooking utensil, such as a stewing pan, a frying pan, or other vessel or pot for cooking food, boiling milk and the like, comprising a metallic preferably an aluminum body having a planar bottom and upwardly turned sidewalls, the inner surface of said body being provided with an adherent nonstick layer of a suitable repellent resinous material, comprising the steps of i. providing a planar blank of aluminum sheeting, of such shape and dimension for forming a cooking vessel having a bottom and sidewalls therefrom, ii. providing said planar blank with annular protusion means projecting from one face of said planar blank in the center portion thereof, where the said planar bottom of the vessel will be formed, iii. coating both faces of said planar blank, the areas adjacent to said protusion means and the flanks of same protusion means inclusive, with an adherent layer of nonstick resinous material, iv. forming a hollow cooking vessel shape from thus coated blank, said vessel having said protusion projecting from the lower face of its bottom, and v. removing the coating layer and material from the top of said protusion means for uncovering the metal of said protusion means for uncovering the metal thereat, to provide narrow uncoated annular areas where the cooking utensil contacts the parts on which it is superimposed for use, while the nonstick surface areas are protected against such contact.

9. The method of claim 8, wherein said annular protusion means are formed by recessing one face of said blank at its surface portions adjacent to the protusions to be formed.

10. The method of claim 8, wherein the removing of the coating layer from the top of said protusion is made by machining said top for cutting it along a plane parallel to and spaced from the faces of said blank and incident the metal contained in said protusions.